(12) United States Patent
Chen

(10) Patent No.: US 8,116,354 B2
(45) Date of Patent: Feb. 14, 2012

(54) SYNC DETECTION DEVICE AND METHOD FOR GNSS

(75) Inventor: Kun-tso Chen, Fang-Yuan Hsiang (TW)

(73) Assignee: Mediatek Inc., Hsin-Chu (TW)

( * ) Notice: Subject to any disclaimer, the term of this patent is extended or adjusted under 35 U.S.C. 154(b) by 895 days.

(21) Appl. No.: 12/138,644

(22) Filed: Jun. 13, 2008

(65) Prior Publication Data

US 2009/0309791 A1    Dec. 17, 2009

(51) Int. Cl.
*H04B 1/00*   (2006.01)
*H04L 7/00*   (2006.01)
(52) U.S. Cl. ........ 375/149; 375/365; 375/366; 375/367; 375/260; 327/141; 358/409; 358/410; 370/503; 370/509; 370/514; 713/400
(58) Field of Classification Search .................. 375/149, 375/354, 365
See application file for complete search history.

(56) References Cited

U.S. PATENT DOCUMENTS

| | | | |
|---|---|---|---|
| 4,301,534 A | 11/1981 | Genter | |
| 4,539,684 A | 9/1985 | Kloker | |
| 5,229,997 A | 7/1993 | Hirata et al. | |
| 5,311,554 A | 5/1994 | Morera et al. | |
| 5,422,916 A | 6/1995 | Nall | |
| 5,463,627 A | 10/1995 | Matsuoka et al. | |
| 5,495,498 A * | 2/1996 | Tominaga | 375/150 |
| 5,539,783 A | 7/1996 | Papson | |
| 5,555,247 A | 9/1996 | Matsuoka et al. | |
| 5,592,518 A | 1/1997 | Davis et al. | |
| 5,619,269 A | 4/1997 | Lee et al. | |
| 5,844,907 A | 12/1998 | Uchiki et al. | |
| 5,949,834 A | 9/1999 | Laud et al. | |
| 6,052,423 A | 4/2000 | Blois et al. | |
| 6,069,928 A | 5/2000 | Gupta | |
| 6,072,839 A | 6/2000 | Mondal et al. | |
| 6,081,570 A | 6/2000 | Ghuman et al. | |
| 6,278,699 B1 | 8/2001 | Atarius | |
| 6,330,251 B1 | 12/2001 | O'Loughlin et al. | |
| 6,389,088 B1 | 5/2002 | Blois et al. | |
| 6,396,411 B1 | 5/2002 | Bell et al. | |
| 6,480,559 B1 | 11/2002 | Dabak | |
| 6,505,220 B1 | 1/2003 | Ikeda | |
| 6,539,047 B1 | 3/2003 | Moon | |
| 6,603,735 B1 | 8/2003 | Park et al. | |
| 6,625,239 B1 | 9/2003 | Shiraishi et al. | |

(Continued)

FOREIGN PATENT DOCUMENTS

GB    2368753 B    12/2002

*Primary Examiner* — Shuwang Liu
*Assistant Examiner* — Gina McKie
(74) *Attorney, Agent, or Firm* — Kirton & McConkie; Evan R. Witt

(57) ABSTRACT

A sync detection device and method for a GNSS receiver. In modernized GNSS, each satellite transmits a data signal and a pilot signal. Correlations are performed between a data symbol stream converted from the data signal with possible hypotheses to find a leading edge of a frame of the data signal (i.e. frame sync detection) and between a pilot symbol stream converted from the pilot signal with possible hypotheses to find a leading edge of a code sequence of the pilot signal (i.e. pilot sync detection). The possible hypotheses for the frame sync detection are selected according to a result of pilot sync detection when pilot sync is done. Frame sync can be efficiently achieved since a range of the selected possible hypotheses is quite limited.

22 Claims, 7 Drawing Sheets

U.S. PATENT DOCUMENTS

| | | |
|---|---|---|
| 6,631,143 B1 | 10/2003 | Karim |
| 6,731,624 B1 | 5/2004 | Maekawa et al. |
| 6,741,578 B1 | 5/2004 | Moon et al. |
| 6,788,732 B2 | 9/2004 | Moon |
| 6,873,647 B1 | 3/2005 | Tiedemann, Jr. et al. |
| 6,882,633 B2 | 4/2005 | Dotsch et al. |
| 6,891,881 B2 | 5/2005 | Trachewsky et al. |
| 6,967,992 B1 | 11/2005 | Rabaeijs et al. |
| 6,993,101 B2 | 1/2006 | Trachewsky et al. |
| 7,006,588 B2 | 2/2006 | Simmons et al. |
| 7,006,840 B2 | 2/2006 | Bultan et al. |
| 7,038,733 B2 | 5/2006 | Dent |
| 7,099,421 B2 | 8/2006 | Simmons et al. |
| 7,130,333 B2 | 10/2006 | Gibson, Jr. et al. |
| 7,231,583 B2 | 6/2007 | Febvre et al. |
| 2005/0147757 A1* | 7/2005 | Roh et al. ............... 427/372.2 |
| 2007/0133727 A1* | 6/2007 | Kim et al. ............... 375/367 |
| 2009/0135802 A1* | 5/2009 | Haga et al. ............... 370/350 |
| 2009/0147757 A1* | 6/2009 | Naka et al. ............... 370/336 |
| 2009/0190704 A1* | 7/2009 | Ben-Ari et al. ............... 375/365 |

* cited by examiner

SYNC DETECTION DEVICE AND METHOD FOR GNSS

TECHNICAL FIELD OF THE INVENTION

The present invention relates to sync detection, more particularly, to sync detection for a modernized GNSS (Global Navigation Satellite System) in which each satellite conveys both data and pilot signals.

BACKGROUND OF THE INVENTION

To improve satellite acquisition and tracking performance, it is a main trend that most of the modernized GNSS will utilize a pilot signal as an aid. That is, in addition to a data signal carrying navigation messages, each satellite in the GNSS further transmits a pilot signal to enhance weak signal tracking. Such modernized GNSS include new generation GPS (Global Positioning System) (e.g. L1C, L2C, L5 bands), Galileo (e.g. E5ab, E6C bands, and L1F, also referred to as E1), and Compass Satellite System.

As mentioned, the data signal carries the navigation messages of a form of unknown data. The pilot signal is "dataless". That is, the content of the pilot signal is known and deterministic. The data signal and pilot signal are respectively modulated with different ranging codes. Moreover, the data signal is modulated with a stream of navigation data frames. The pilot signal is modulated by a periodic secondary code sequence. On the other hand, the pilot signal of some GNSS systems is not modulated by the secondary code sequence. Although the formats of the data and pilot signals are different from each other, timing relationship between the data and pilot signals is in-phase. To demodulate the data carried in the data signal, it is necessary to determine the phase of the leading edge of each frame, that is, to determine the boundary of the frame. Determination of the frame boundary (i.e. the leading edge) is referred to as "frame sync". In addition, it is also necessary to carry out "pilot sync", which means to find the phase of the secondary code modulating the pilot signal, that is, to determine the leading edge of the secondary code sequence.

In general, each frame of the data signal has a sync word or the like. Once the position of the sync word is determined, the frame boundary is found. However, the data carried by the data signal is random. It is possible that the pattern of the sync word also appears in the random data, and thereby resulting in false alarm for the frame sync. Another cause which may result in false alarm of frame sync is noise.

Conventionally, the received data symbols are correlated with possible hypotheses to determine the frame boundary. Therefore, correlation computation load is quite heavy. In addition, a requirement for relevant hardware such as correlators, buffers, processors and so on consumes high costs. For Galileo E1, there are 250 frame sync hypotheses for the data signal E1B since each frame of the E1B consists of 250 symbols. There are 25 pilot sync hypotheses for the pilot signal E1C since each secondary code sequence has 25 symbols. The most possible hypotheses are sieved from correlation results, and the sieved hypotheses are verified by further signal processing such as Viterbi decoding, CRC and so on. As known, those signal processing schemes are very complex and take a long period of time to process.

It is desirable to reduce the computation complexity and to reduce false alarm probability when carrying out the frame sync/pilot sync. The present invention provides an effective solution to satisfy such requirements.

SUMMARY OF THE INVENTION

In accordance with an embodiment of the present invention, a sync detection device comprises a frame sync correlation unit for correlating symbols of a data symbol stream converted from the data signal with possible hypotheses of a frame of the data signal to output correlation results; a pilot sync correlation unit for correlating symbols of a pilot symbol stream converted from the pilot signal with possible hypotheses of a code sequence of the pilot signal to output correlation results; and a sync decision unit receiving the correlation results from the frame sync correlation unit and pilot sync correlation unit, determining whether a frame sync in which a leading edge of the frame is found is done according to the correlation results from the frame sync correlation unit, determining whether a pilot sync in which a leading edge of the code sequence is found is done according to the correlation results from the pilot sync correlation unit and selecting which hypotheses should be the possible hypotheses of the frame according to a result of the pilot sync when the pilot sync is done. The frame sync correlation unit and the pilot sync correlation unit can operate in parallel. Once the pilot sync is done, a range of the possible hypotheses for the frame sync correlation unit is reduced according to the result of the pilot sync. Alternatively, the frame sync correlation unit stands-by until the pilot sync is done. Then the sync decision unit determines the possible hypotheses for the frame sync correlation unit according to the result of the pilot sync.

In accordance with another embodiment of the present invention, a sync detection method comprises: correlating symbols of a data symbol stream converted from the data signal with possible hypotheses of a frame of the data signal to output correlation results; correlating symbols of a pilot symbol stream converted from the pilot signal with possible hypotheses of a code sequence of the pilot signal to output correlation results; determining whether a frame sync in which a leading edge of the frame is found is done according to the correlation results for the data signal; determining whether a pilot sync in which a leading edge of the code sequence is found is done according to the correlation results for the pilot signal; and selecting which hypotheses should be the possible hypotheses of the frame according to a result of the pilot sync if the pilot sync is done while the frame sync has not been done. The frame sync correlation and the pilot sync correlation can be operated in parallel. Once the pilot sync is done, a range of the possible hypotheses for the frame sync correlation is reduced according to the result of the pilot sync. Alternatively, the pilot sync correlation is operated first until the pilot sync is done. The possible hypotheses for the frame correlation unit are selected according to the result of the pilot sync. Then the frame sync correlation is operated based on the selected possible hypotheses.

BRIEF DESCRIPTION OF THE DRAWINGS

The present invention will be described in detail in conjunction with the appending drawings, in which.

DETAILED DESCRIPTION OF THE INVENTION

For a Global Navigation Satellite System (GNSS) in which each satellite transmits a data signal and a pilot signal, the data signal and the pilot signal are in-phase in timing. As mentioned, the pilot signal is modulated by a known periodic secondary code. If the pilot sync is done, the pilot sync result can be used as an aid to achieve the frame sync.

Figure 1:
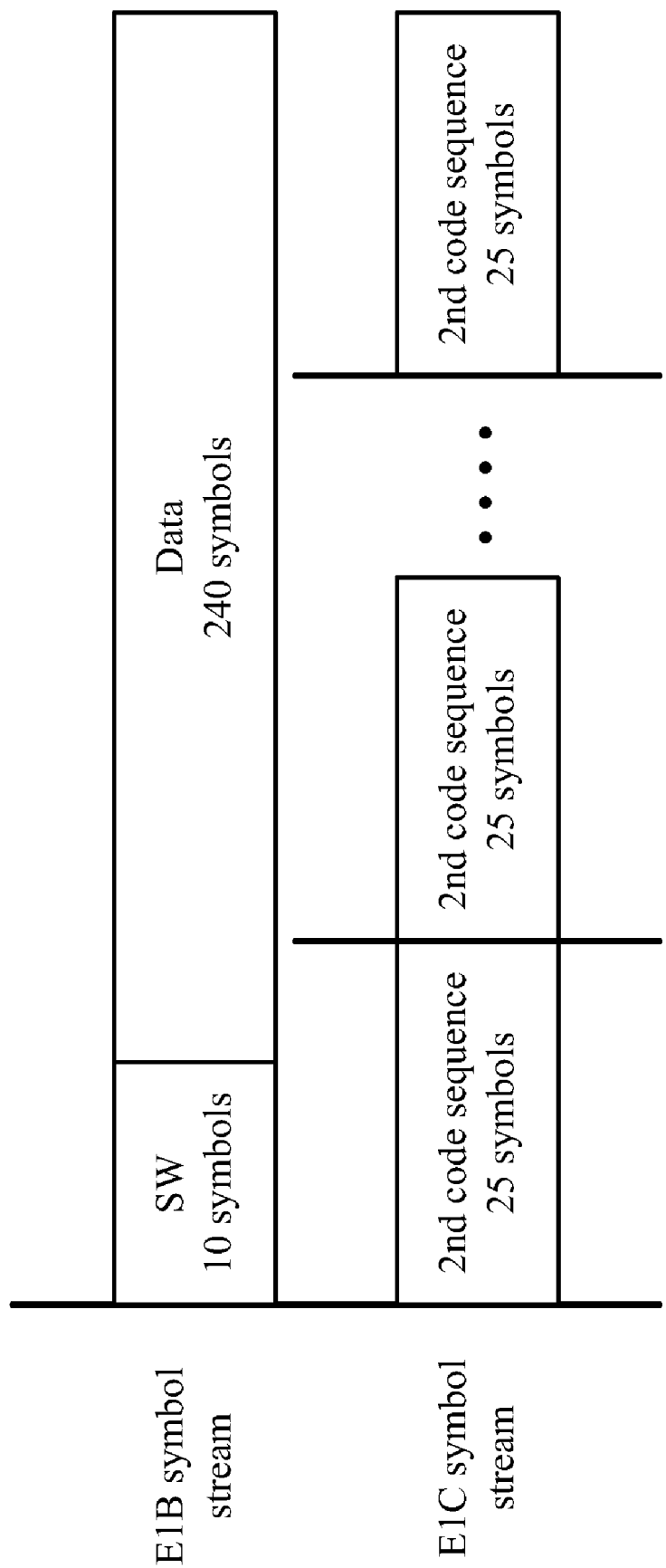
FIG. 1 shows data structures of the data signal and pilot signal of Galileo E1.

FIG. 1 shows data structures of the data signal and pilot signal of Galileo E1 which is one kind of GNSS. In Galileo E1, each satellite transmits the data signal E1B and the pilot signal E1C. The upper portion of this drawing shows a symbol stream of the data signal E1B, while the lower portion shows a symbol stream of the pilot signal E1C. The data signal E1B is transmitted by frames, and the pilot signal E1C is transmitted as repeated secondary code sequences. Each frame of the data signal E1B contains 120 data bits, and the data bits are encoded by a convolution coding scheme into 250 symbols per second. The symbol period is 4 ms. The pilot signal is modulated by a periodic secondary code sequence. Each sequence contains 25 symbols. Then the secondary code period is 4×25=100 ms.

As shown, each frame of the data signal E1B contains a sync word (SW) of 10 symbols and a payload data area of 240 symbols. The payload data area carries unknown data for navigation. During the frame period of 1 second, the pilot signal E1C has the secondary code sequence of 25 symbols repeated 10 times. E1B frame sync is done if a start symbol of SW is found. The start symbol of SW can be any one of the 250 symbols, so that the probability to find the SW start symbol without any aiding information is 1/250. E1C pilot sync is done if a start symbol of the secondary code sequence is found. The start symbol of the sequence is one of the 25 symbols. As can be seen, the start symbol of the sync word SW must be aligned with the start symbol of one of the ten repeated sequences. Accordingly, if the pilot sync is done, then the possible candidates for the SW start symbol are reduced to 10 symbols, which are respectively aligned with the start symbols of the ten sequences. Therefore, the probability to find the SW start symbol is lifted to 1/10.

Figure 2:
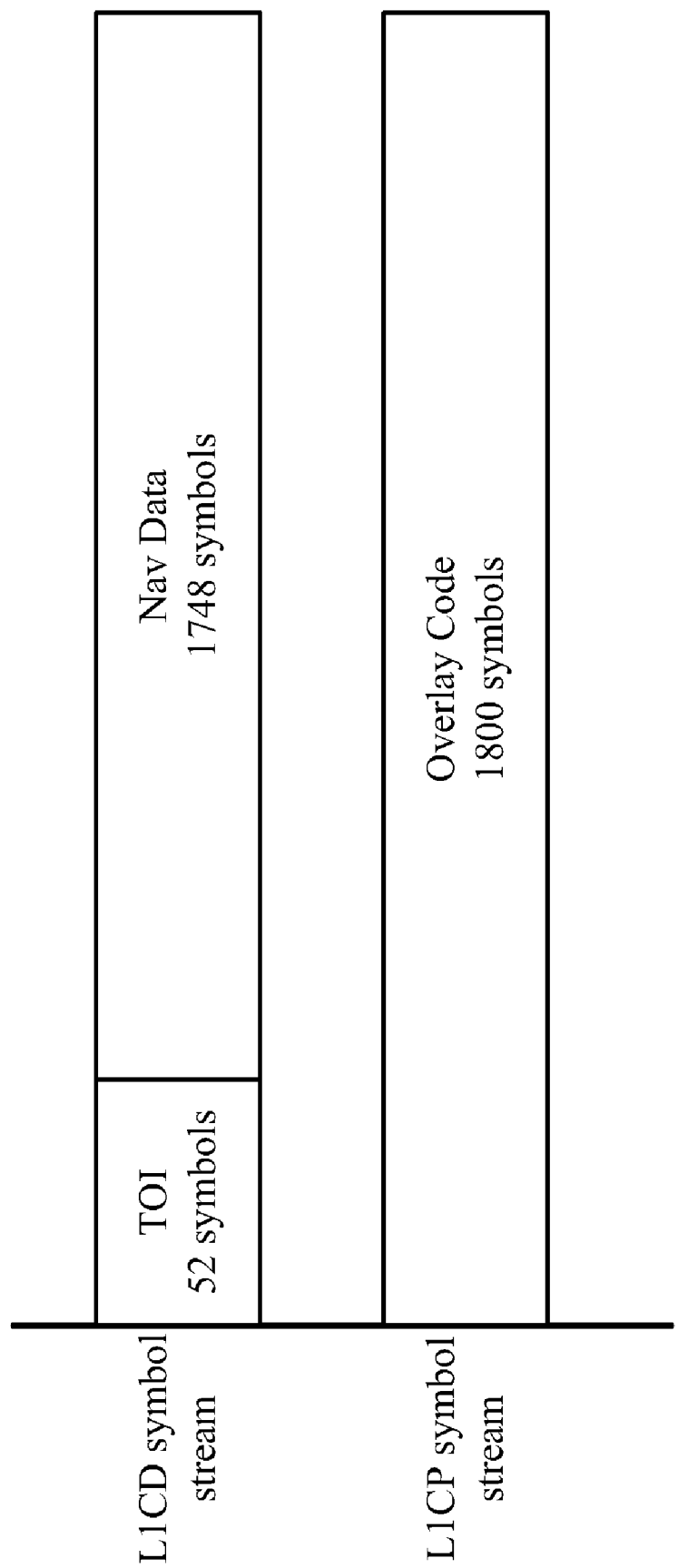
FIG. 2 shows data structures of the data signal and pilot signal of GPS L1C.

FIG. 2 shows data structures of the data signal and pilot signal of GPS L1C which is another kind of GNSS. The upper portion of this drawing shows a symbol stream of the data signal L1CD, while the lower portion shows a symbol stream of the pilot signal L1CP. Each frame of the data signal L1CD has 9 bits of "Time of Interval" (TOI) word. The 9-bit TOI is encoded into 52 symbols using Bose, Chaudhuri, and Hocquenghem (BCH) coding. The TOI can be deemed as SW of Galileo E1. In addition to the TOI, each frame further contains navigation data of 1748 symbols. The symbol period is 10 ms. That is, the symbol timing for GPS L1C is 100 symbols per second. The pilot signal L1CP uses the same symbol timing. L1CP is encoded with a secondary code sequence, which is referred to as an "overlay code", of 1800 symbols. For each L1CD frame, the code sequence of the pilot signal L1CP appears once. The frame sync for L1CD means that the start symbol of the TOI is found, and the pilot sync for L1CP means that the start symbol of the secondary code sequence is found. As can be seen, the leading edge of L1CD TOI is aligned with the leading edge of the L1CP overlay code. Accordingly, once the pilot sync is done, the frame sync is also done, and vise versa.

Figure 3:
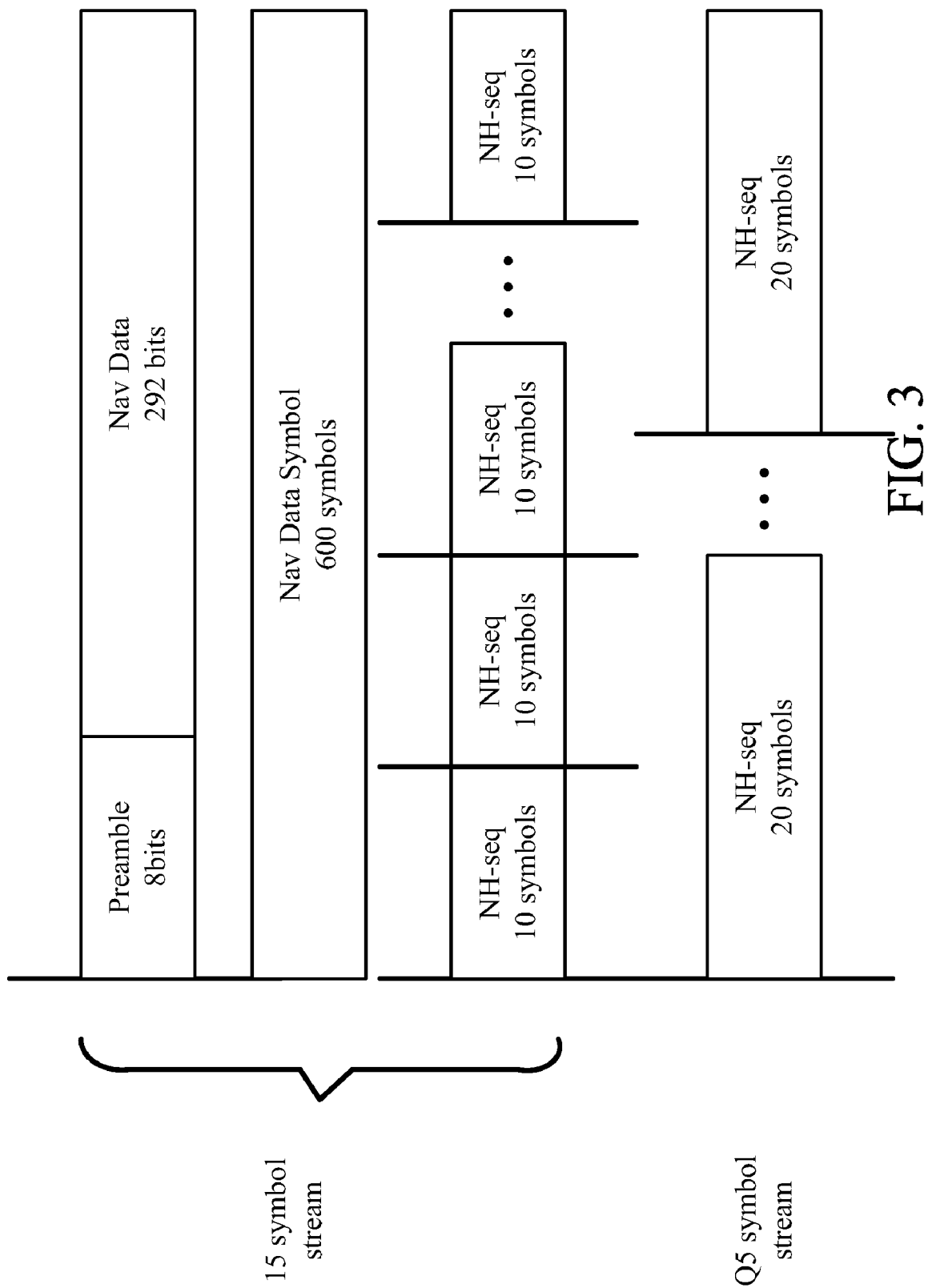
FIG. 3 shows data structures of the data signal and pilot signal of GPS L5.

FIG. 3 shows data structures of the data signal and pilot signal of GPS L5 which is another kind of GNSS. The upper three rows of this drawing show a symbol stream of the data signal I5, while the lowest row shows a symbol stream of the pilot signal Q5. Each I5 frame contains 8 bits of preamble and 292 bits of navigation data. The 300-bit frame is encoded with forward error correction (FEC) coding into 600 data symbols. Then each data symbol (the data symbol period is 10 ms) is modulated by a Neumann Hoffman (NH) sequence, and each sequence has 10 code symbols (the code symbol period is 1 ms). The symbol timing is 1000 symbols per second. The pilot signal Q5 has a 20-symbol secondary NH-sequence repeated with the same symbol timing of 1000 symbols per second. To carry out the I5 frame sync, a start bit of the preamble, which is equivalent to the SW of Galileo E1, should be found. To find the start bit of the preamble, I5 data symbol sync must be achieved first. To carry out Q5 pilot sync, a start symbol of the secondary code sequence (i.e. the 20-symbol NH sequence) must be found. Although the intermediate conversion of the I5 frame is complicated, the start bit of the preamble is indirectly aligned with the start symbol of one of the Q5 secondary code sequences. Accordingly, when the start symbol of the Q5 secondary code sequence is determined, it will be much easier to determine the preamble start bit.

In the following descriptions, Galileo E1 will be taken as an example to recite the technical features of the present invention.

Figure 4:
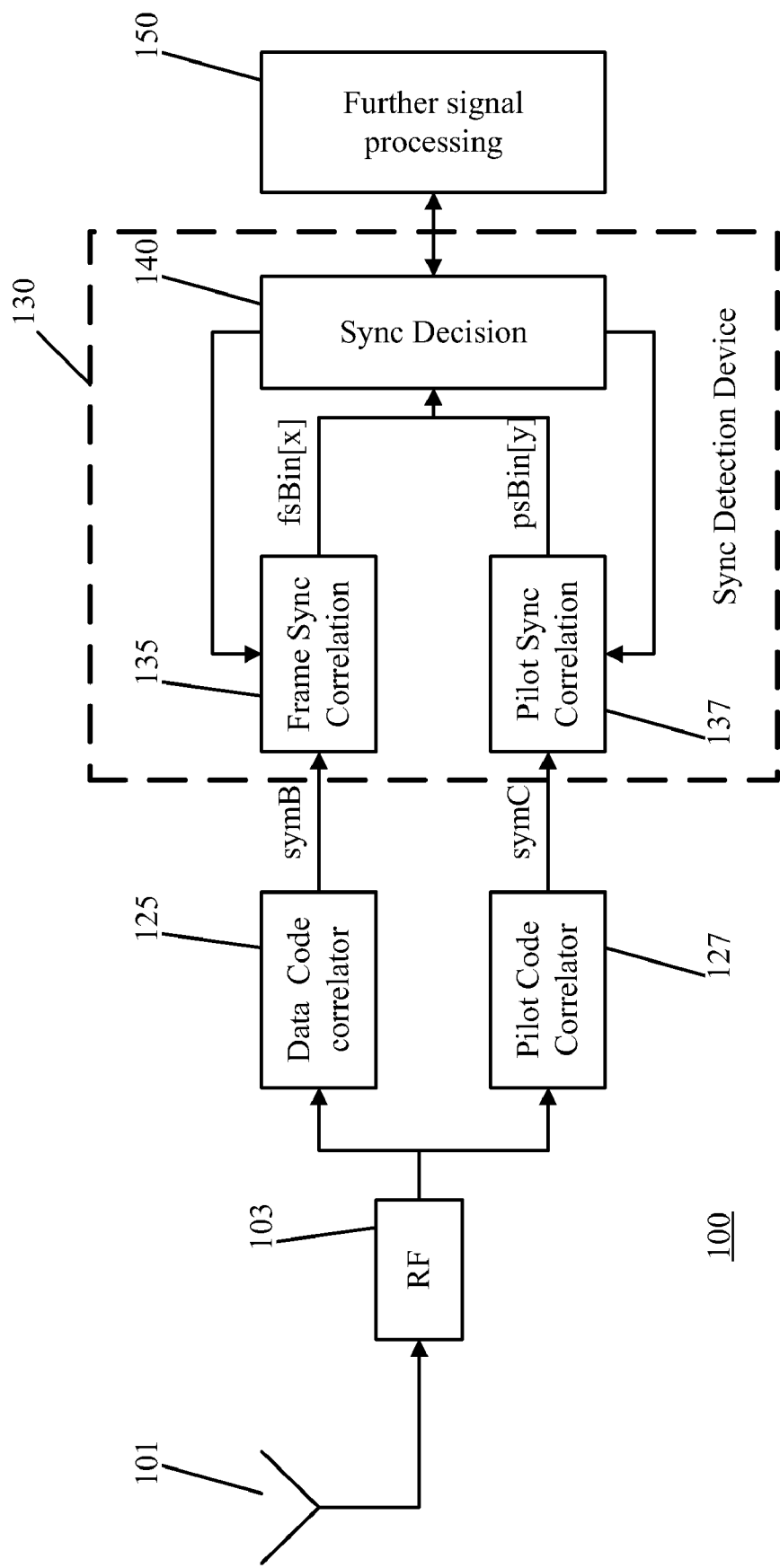
FIG. 4 is a block diagram schematically and generally showing a GNSS receiver in accordance with the present invention.

FIG. 4 is a block diagram showing a GNSS receiver 100 in accordance with the present invention. The receiver includes an antenna 101 for receiving a satellite signals. The satellite signals from each satellite include a data signal and a pilot signal. An RF front end 103 is used to perform RF relevant operations such as down conversion and so on as widely known in this field. The receiver 100 has a data code correlator 125 for correlating the signal from the RF front end 103 with a ranging code for the data signal (i.e. a primary code) to output a data symbol stream and a pilot code correlator 127 for correlating the signal from the RF front end 103 with a ranging code for the pilot signal (i.e. a secondary code) to output a pilot symbol stream. Taking Galileo E1 as an example, the data code correlator 125 outputs a data symbol stream symB of the data signal E1B, and the pilot code correlator 127 outputs a pilot symbol stream symC of the pilot signal E1C.

In accordance with the present invention, the receiver 100 has a sync detection device 130. The sync detection device 130 includes a frame sync correlation unit 135 for correlating the symbols of the data symbol stream symB with the possible hypotheses to output the correlation results thereof. For E1B, there are 250 hypotheses to be correlated as mentioned above if there is no other aiding information to reduce the correlation range. One simple frame sync correlation rule is: for a given received symB stream, {symB[0], symB[1], ..., symB[249]}, take the estimate of the sync word (SW) location X to be the value of x, which maximizes the statistic $$fsBin[x] = \sum_{i=0}^{9} symB[(i+x) \bmod 250] \cdot SW[i]$$

where {SW[0], SW[1], ..., SW[9]} is the sync word and x is chosen from fsList={0, 1, ..., 249}. Other rules or implementations are also possible. The frame sync correlation unit 135 updates fsBin[x] for x in the assigned fsList by processing the received symB. Accordingly, a set of the correlation results, fsBin[x], for x={0, 1, . . . , 249}, is outputted from the frame sync correlation unit 135. A pilot sync correlation unit 137 is used to correlate the symbols of the pilot symbol stream symC with the possible hypotheses to output the correlation results thereof. For example, a simple pilot sync correlation rule is: for a given received symC stream, {symC[0], symC[1], . . . , symC[24]}, take the estimate of the secondary code beginning location (or secondary code phase) Y to be the value of y, which maximizes the statistic $$psBin[y] = \sum_{i=0}^{24} symC[(i+y) \bmod 25] \cdot NH[i]$$

where {NH[0], NH[1], . . . , NH[24]} is the secondary code sequence and y is chosen from psList={0, 1, . . . , 24}. Other rules or implementations are possible. The pilot sync correlation unit 137 updates psBin[y] for y in the assigned psList by processing the received symC. Accordingly, a set of the correlation results psBin[y], for y={0, 1, . . . , 24}, is outputted from the pilot sync correlation unit 137. For E1C, there are 25 symbols to be correlated as mentioned above. Accordingly, a set of the correlation results psBin[y], for y={0, 1, . . . , 24}, is outputted from the pilot sync correlation unit 137. The sync detection device 130 further has a sync decision unit 140. The sync decision unit 140 receives the correlation result sets fsBin[x] of the data symbol stream symB and psBin[y] of the pilot symbol stream symC to carry out the frame sync and pilot sync. The operations of the sync detection device 130 will be further described in detail later.

Figure 5:
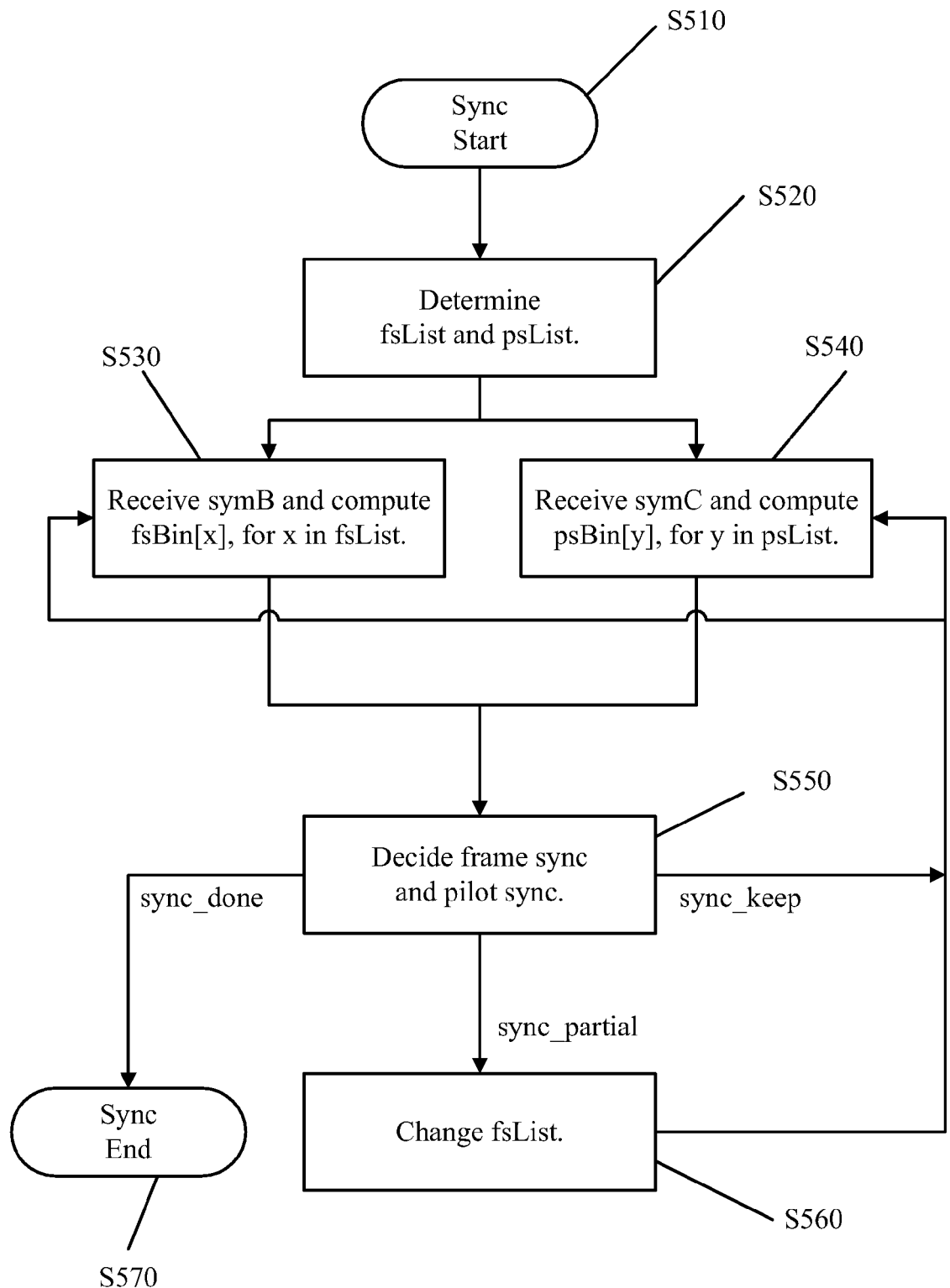
FIG. 5 is a flow chart showing a sync detection method in accordance with an embodiment the present invention.

FIG. 5 is a flow chart showing a sync detection method performed by the sync detection device 130 in accordance with an embodiment of the present invention. The sync detection method of this embodiment is referred to as a parallel sync detection method. Galileo E1 is again described here as an example. In step S510, a sync detection process starts. In step S520, the sync decision unit 140 determines a list of the frame sync hypotheses fsList and a list of pilot sync hypotheses psList. In Galileo E1 example, the frame sync list fsList={0, 1, . . . , 249}, which includes 250 hypotheses, while the pilot sync list psList={0, 1, . . . , 24}, which includes 25 hypotheses, without using aiding information to reduce the hypothesis numbers. If there is aiding information from a PVT (position-velocity-time) navigation processor or an AGNSS (assisted GNSS) server, the hypothesis numbers of the frame sync list fsList and pilot sync list psList can be reduced. The sync decision unit 140 provides the determined frame sync list fsList and pilot sync list psList to the frame sync correlation unit 135 and the pilot sync correlation unit 137, respectively.

In step S530, the frame sync correlation unit 135 receives the data symbol stream of symB (or referred to as a frame symbol stream) and updates the frame sync statistic fsBin[x] for x in the frame sync list fsList. In step S540, the pilot sync correlation unit 137 receives the pilot symbol stream of symC and updates the pilot sync statistic psBin[y] for y in the pilot sync list psList. It is noted that the steps S530 and S540 are practically carried out in parallel. The frame symbol stream symB and the pilot symbol stream symC from the data code correlator 125 and the pilot code correlator 127 are sampled every 4 ms in this example, and the updated correlation results fsBin[x] and psBin[y] are passed to the sync detection device 130.

The correlation results fsBin[x] and psBin[y] are passed to the sync decision unit 140 and the sync decision unit 140 decides whether the frame sync and pilot sync are done in step S550. If neither the frame sync nor the pilot sync has been done, the process goes back to steps S530 and S540. If the sync decision unit 140 determines that the frame sync is done, it means that the pilot sync is also done. Then the sync decision unit 140 decides that it is a sync_done mode and stops the operations of the frame sync correlation unit 135 and the pilot sync correlation unit 137. The whole process of the sync detection ends in step S570.

If the sync decision unit 140 determines that the pilot sync has been done while the frame sync has not been done, then it is a sync_partial mode. The pilot sync correlation unit 137 can be deactivated. The sync decision unit 140 changes the frame sync list fsList, that is, changes hypotheses listed in the frame sync list fsList, according to the pilot done result in step S560. As described above, in the case of Galileo E1, once the start symbol of the pilot secondary code sequence is found, possible hypotheses for the start symbol of SW are reduced to ten symbols aligned to the start symbols of the respective repeated pilot secondary code sequences. For instance, if the symbol 0 of the pilot sync list psList is determined as the start symbol of the pilot secondary code sequence, then the frame sync list fsList can be changed to a new frame sync list fsList={0, 25, 50, 75, 100, 125, 150, 175, 200, 225}. In the case of Galileo E1, the fsList is changed from a 250-symbol list to a 10-symbol list when the start symbol of the pilot secondary code sequence is determined. In another embodiment, this new fsList and the old fsList can be used to determine the next fsList. For example, if the old fsList is {49, 50, . . . , 76} even from PVT navigation processor prediction or the frame sync correlation results, then the next fsList used in the following frame sync correlation and detection will change to {50, 75}. Therefore, a lot of frame sync hypothesis correlation and computation power are saved. In addition, it will reduce the false alarm probability of frame sync. It is noted that the frame sync list fsList is changed only once by the pilot sync result upon the pilot sync is done. Then the process repeats the steps S530, and S550 until the frame sync is done.

Figure 6:
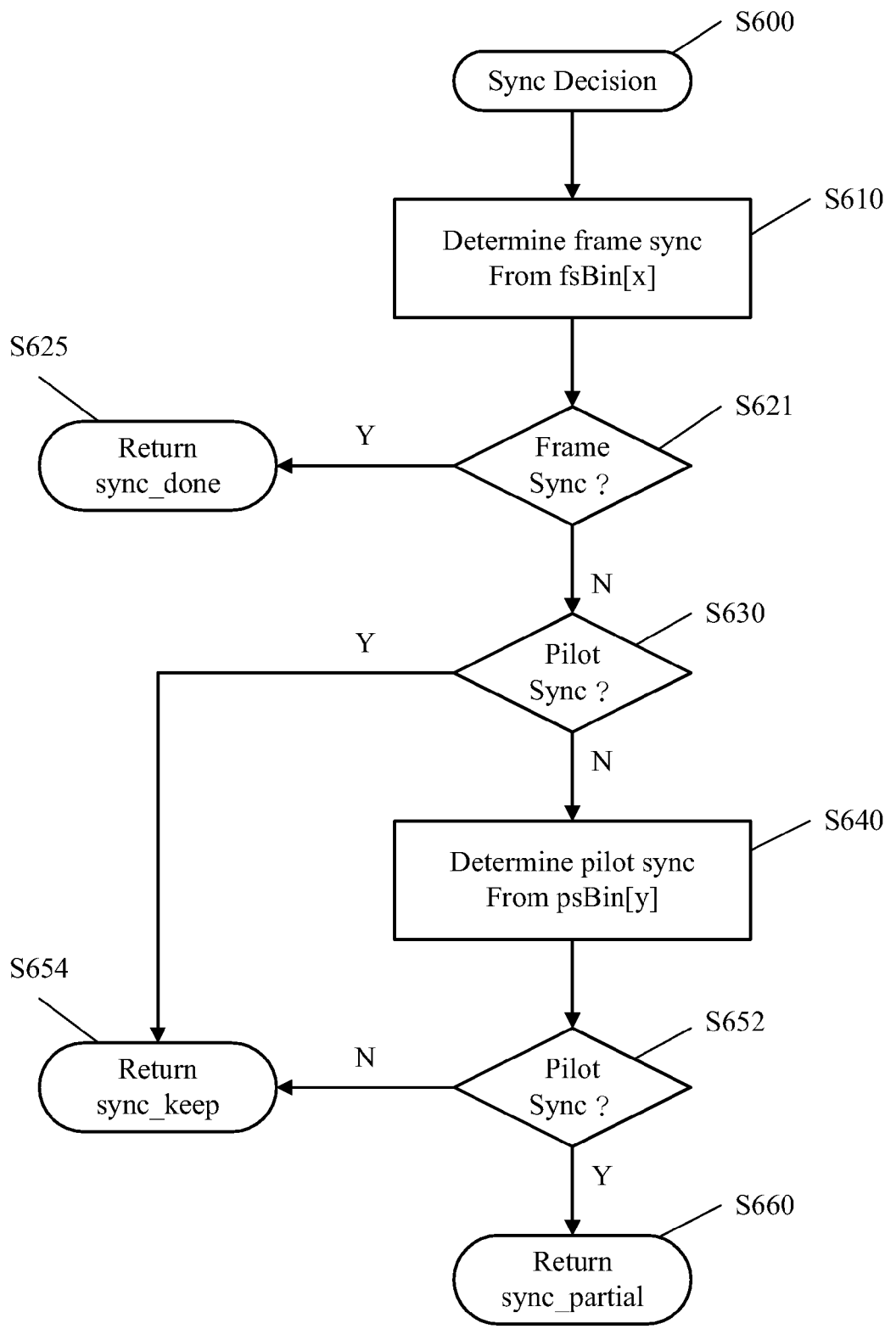
FIG. 6 is a flow chart showing a decision process of the sync detection method of FIG. 5.

FIG. 6 is a flow chart showing the decision step S550 of the sync detection method described above in detail. In step S600, a sync decision process starts. In step S610, the sync decision unit 140 carries out the frame sync detection, that is, determines a start symbol of the frame, from the frame correlation result fsBin[x]. In step S621, the sync decision unit 140 determines whether the frame sync is done. If so, it is set as the sync_done mode (step S625). If not, in step S630, it is determined whether the pilot sync is done. As known, the pilot sync cannot be done in the beginning. If not, the sync decision unit 140 carries out the pilot sync detection from the pilot correlation result psBin[y] in step S640. In step S652, it is determined whether the pilot sync is done. If the pilot sync is done, then it is set to be the sync_partial mode in step S660. That frame sync list will be changed. If the pilot sync has not been done, the process is set to be the sync_keep mode. That is, the frame sync detection and pilot sync detection are continued. Once the pilot sync is done, in each sync decision process of the following circulations, the determined result of the step S630 will always be "Y". That is, after the pilot sync is done, the frame sync list is changed, and it is only necessary to execute the frame sync detection based on the changed frame sync list until the frame sync is done.

Figure 7:
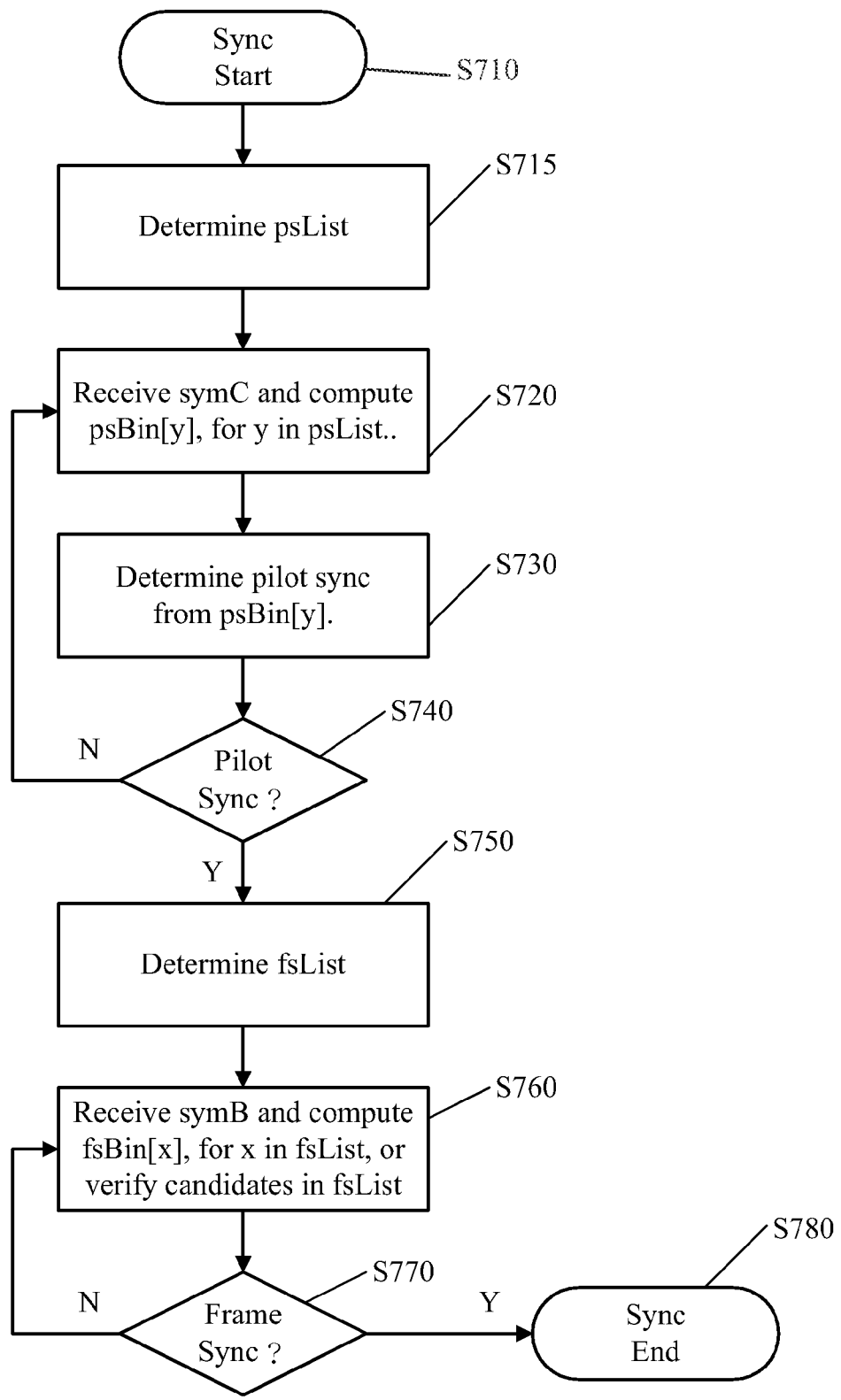
FIG. 7 is a flow chart showing a sync detection method in accordance with another embodiment the present invention.

FIG. 7 is a flow chart showing a sync detection method performed by the sync detection device 130 in accordance with another embodiment of the present invention. The sync detection method of the present embodiment is referred to as a sequential sync detection method. Rather than carrying out the frame sync detection and the pilot sync detection in parallel, in the present embodiment, the pilot sync detection is carried out first, and the frame sync detection is standby until the pilot sync is done. In step S710, a sync detection process starts. In step S715, the sync decision unit 140 determines a list of pilot sync hypotheses psList. In step S720, the pilot sync correlation unit 137 receives the pilot symbol stream symC of Galileo E1, for example, and computes correlation result psBin[y] (i.e. the pilot correlation result) for hypothesis y in the pilot sync list psList. In step S740, the sync decision unit 140 determines whether the pilot sync is done. If not, the process goes back to step S720. If the pilot sync has been done, the process goes to step S750 to determine a list of frame hypotheses fsList. In the case of Galileo E1, the determined fsList contains at most only 10 hypotheses since the start symbol of the secondary code sequence of the pilot symbol stream symC has been found. The PVT navigation processor can predict the possible frame sync word position if aiding data is available and thus further reduces the size of fsList. In step S760, the frame sync correlation unit 135 receives the pilot symbol stream symB and computes correlation result fsBin[x] (i.e. the frame correlation result) for a hypothesis x in the frame sync list fsList until the frame start symbol is determined. Alternatively, the correlation results fsBin[x] for all candidates in the frame sync list fsList are computed in parallel and then are verified to determine the leading edge of the frame according to fsBin[x] and the pilot sync result. In step S770, it is determined whether the frame sync is done. If not, the process goes back to step S760. If the frame sync is done, then the sync detection ends in step S780.

In the present invention, the pilot sync detection is carried out in parallel with the frame sync detection, alternatively, the pilot sync detection is carried out prior to the frame sync detection. Once the pilot sync detection is done, the pilot sync result can be used to reduce the detection range of the frame sync detection. Therefore, the signal processing load can be reduced, so as the buffer requirement for the frame sync detection. In addition, false alarm probability can be reduced, the time to achieve frame sync can be shortened and the sync sensitivity can be enhanced since the number of the candidates of the frame sync hypotheses is significantly decreased once the pilot sync is done.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A sync detection device for a GNSS receiver, comprising:
    a frame sync correlation circuit for correlating symbols of a data symbol stream converted from a data signal with possible hypotheses of a frame of the data signal to output correlation results;
    a pilot sync correlation circuit for correlating symbols of a pilot symbol stream converted from a pilot signal with possible hypotheses of a code sequence of the pilot signal to output correlation results; and
    a sync decision circuit for determining whether a frame sync, in which a leading edge of the frame is found, is done according to the correlation results from the frame sync correlation circuit, determining whether a pilot sync, in which a leading edge of the code sequence is found, is done according to the correlation results from the pilot sync correlation circuit and reducing a number of the possible hypotheses of the frame according to a result of the pilot sync when the pilot sync is done.

2. The sync detection device of claim 1, wherein the frame sync correlation circuit and the pilot sync correlation circuit operate correlation in parallel.

3. The sync detection device of claim 2, wherein the sync decision circuit further determines a frame sync list containing the possible hypotheses of the frame of the data signal and a pilot sync list containing the possible hypotheses of the code sequence of the pilot signal in the beginning.

4. The sync detection device of claim 3, wherein the sync decision circuit determines the frame sync list and the pilot sync list using aiding information.

5. The sync detection device of claim 3, wherein the sync decision circuit reduces the possible hypotheses of the frame by changing the frame sync list according to the result of the pilot sync when the pilot sync is done.

6. The sync detection device of claim 1, wherein the pilot sync correlation circuit operates the correlation first, and the frame sync correlation circuit operates the correlation after the pilot sync is done.

7. The sync detection device of claim 1, wherein the frame sync correlation circuit correlates the symbols of the data symbol stream with the possible hypotheses of the frame reduced according to the result of the pilot sync in sequence until the frame sync is done.

8. The sync detection device of claim 1, wherein the frame sync correlation circuit correlates the symbols of the data symbol stream with all of the possible hypotheses of the frame reduced according to the result of the pilot sync to generate the correlation results and passes the correlation results to the sync decision circuit to determine a phase of the leading edge of the frame.

9. The sync detection device of claim 1, wherein the sync decision circuit instructs to deactivate the frame sync correlation circuit when the sync decision circuit determines that the frame sync is done.

10. The sync detection device of claim 1, wherein the sync decision circuit instructs to deactivate the pilot sync correlation circuit when the sync decision circuit determines that the pilot sync is done.

11. The sync detection device of claim 1, wherein the sync decision circuit selects hypotheses of a frame aligned with the leading edge of each code sequence of the pilot signal as the reduced number of possible hypotheses of the frame.

12. A sync detection method for a GNSS receiver, comprising:
    correlating symbols of a data symbol stream converted from a data signal with possible hypotheses of a frame of the data signal to output correlation results for the data signal;
    correlating symbols of a pilot symbol stream converted from a pilot signal with possible hypotheses of a code sequence of the pilot signal to output correlation results for the pilot signal;
    determining whether a frame sync, in which a leading edge of the frame is found, is done according to the correlation results for the data signal;
    determining whether a pilot sync, in which a leading edge of the code sequence is found, is done according to the correlation results for the pilot signal; and
    reducing a number of the possible hypotheses of the frame according to a result of the pilot sync if the pilot sync is done while the frame sync has not been done.

13. The sync detection method of claim 12, wherein the step of correlating the symbols of the data symbol stream with the possible hypotheses of the frame and the step of correlating the symbols of the pilot symbol stream with the possible hypotheses of the code sequence are operated in parallel.

14. The sync detection method of claim 13, further comprising determining a frame sync list containing the possible hypotheses of the frame and a pilot sync list containing the possible hypotheses of the code sequence before the correlating steps.

15. The sync detection method of claim 14, wherein the frame sync list and the pilot sync list are determined by using aiding information.

16. The sync detection method of claim 14, wherein the step of reducing the number of the possible hypotheses of the frame comprises changing the frame sync list according to the result of the pilot sync.

17. The sync detection method of claim 12, wherein the step of correlating the symbols of the pilot symbol stream with the possible hypotheses of the code sequence is operated first until the pilot sync is done, and then the step of correlating the symbols of the data symbol stream with the possible hypotheses of the frame is operated after the pilot sync is done.

18. The sync detection method of claim 12, wherein the symbols of the data symbol stream are correlated with the possible hypotheses of the frame reduced according to the result of the pilot sync in sequence until the frame sync is done.

19. The sync detection method of claim 12, wherein the symbols of the data symbol stream are correlated with all of the possible hypotheses of the frame reduced according to the result of the pilot sync to generate the correlation results for the data signal and the leading edge of the frame is determined according to the generated correlation results for the data signal.

20. The sync detection method of claim 12, further comprising stopping the step of correlating the symbols of the data symbol stream with the possible hypotheses of the frame when the frame sync is done.

21. The sync detection method of claim 12, further comprising stopping the step of correlating the symbols of the pilot symbol stream with the possible hypotheses of the code sequence when the pilot sync is done.

22. The sync method of claim 12, wherein hypotheses of a frame aligned with the leading edge of each code sequence of the pilot signal are selected as the reduced number of possible hypotheses of the frame.

* * * * *